(12) United States Patent
Suermann et al.

(10) Patent No.: US 6,649,228 B2
(45) Date of Patent: Nov. 18, 2003

(54) LIQUID-CRYSTAL MEDIUM, AND ELECTRO-OPTICAL LIQUID-CRYSTAL DISPLAY

(75) Inventors: Juliane Suermann, Darmstadt (DE); Bernhard Rieger, Muenster-Altheim (DE)

(73) Assignee: Merck Patent Gesellschaft mit Beschraenkter Haftung, Darmstadt (DE)

( * ) Notice: Subject to any disclaimer, the term of this patent is extended or adjusted under 35 U.S.C. 154(b) by 58 days.

(21) Appl. No.: 09/984,163

(22) Filed: Oct. 29, 2001

(65) Prior Publication Data

US 2002/0104983 A1 Aug. 8, 2002

(30) Foreign Application Priority Data

Oct. 27, 2000 (DE) .......................................... 100 53 285

(51) Int. Cl.$^7$ ........................ C09K 19/30; C09K 19/34; C09K 19/20
(52) U.S. Cl. .............. 428/1.1; 252/299.61; 252/299.63; 252/299.67
(58) Field of Search ...................... 428/1.1; 252/299.66, 252/299.67, 299.63, 299.61

(56) References Cited

U.S. PATENT DOCUMENTS 5,976,404 A * 11/1999 Hirschmann et al. .. 252/299.01

* cited by examiner

*Primary Examiner*—Shean C. Wu
(74) *Attorney, Agent, or Firm*—Millen, White, Zelano & Branigan, P.C.

(57) ABSTRACT

The present invention relates to liquid-crystalline media which comprise at least one compound of the formula I and at least one compound of the formula II

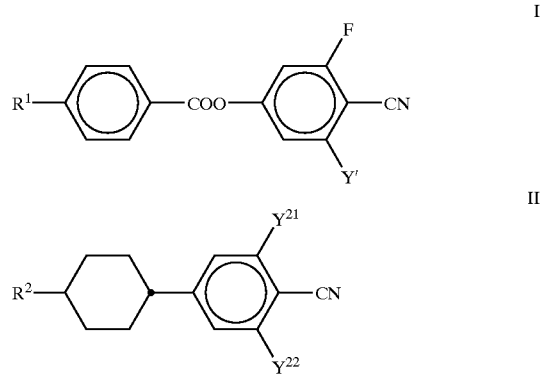

in which the parameters are as defined herein, to the use of these liquid-crystal media in electro-optical displays, and to these displays, in particular STN-LCDs.

17 Claims, No Drawings

LIQUID-CRYSTAL MEDIUM, AND ELECTRO-OPTICAL LIQUID-CRYSTAL DISPLAY

The present invention relates to liquid-crystalline media which comprise at least one compound of the formula I and at least one compound of the formula II

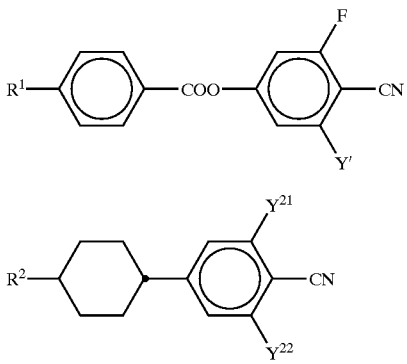

in which
$R^1$ is alkyl or alkoxy having from 1 to 7 carbon atoms or alkoxyalkyl, alkenyl or alkenyloxy having from 2 to 7 carbon atoms, preferably alkyl or alkoxyalkyl,
$Y^1$ is H or F, preferably H,
$R^2$ is alkenyl or alkenyloxy having from 2 to 7 carbon atoms, preferably alkenyl, and
$Y^{21}$ and $Y^{22}$ are each, independently of one another, H or F, preferably at least one is H, particularly preferably both are H,
and to the use of these liquid-crystalline media in liquid-crystal displays, and to these liquid-crystal displays, in particular STN displays.

In liquid-crystal displays of this type, the liquid crystals are used as dielectrics whose optical properties change reversibly on application of an electric voltage. Electro-optical displays which use liquid crystals as media are known to the person skilled in the art. These liquid-crystal displays use various electro-optical effects. The most common of these are the TN effect (twisted nematic, having a homogeneous, virtually planar initial alignment of the liquid crystals and a nematic structure which is twisted by about 90°) and the STN effect (supertwisted nematic) and the SBE effect (supertwisted birefringence effect). In these and similar electro-optical effects, liquid-crystalline media of positive dielectric anisotropy ($\Delta\epsilon$) are used.

In STN displays, which, in the present application, include all common and known types of display with relatively high twist, such as, for example, SBE, GH (guest/host), STN and OMI (optical mode interference) displays, as well as compensated STN displays, such as DSTN and film-compensated STN displays, the liquid-crystal director is twisted from one side of the liquid-crystal layer to the other by a given angle of from greater than 90°, typically of 180° or more, up to 600°, typically up to 270°. This is achieved on the one hand by corresponding alignment of the preferential directions of the liquid-crystal alignment of the two substrates to one another. The preferential direction of the alignment on the substrates is achieved by an anisotropic pretreatment, typically by rubbing a special, usually polymeric organic layer in one direction, or by vapour-deposition of $SiO_x$ at an angle. On the other hand, a chiral liquid-crystal medium is employed which consists of mesogenic chiral substances or, most widespread, consists of a non-chiral medium to which a chiral substance (a so-called dopant) is added. The latter alternative is usually preferred since, through variation of the concentration of the dopant, it enables the twist of the liquid-crystal layer to be set to virtually any desired values.

It must be ensured here that the ratio of the layer thickness of the liquid-crystal layer (d) to the cholesteric pitch of the liquid-crystal (P) is sufficiently great in order to produce the desired twist. To this end, a twist value of more than 90° (or d/P=90°/360°=0.25) below the desired twist is generally set. This so-called geometrical limit is thus, for example, 0.5−0.25=0.25 for cells having a twist of 180° and 0.667−0.25= 0.417 for a cell having a twist of 240°. The upper geometrical limit is in each case at a twist which is 180° higher, i.e. at a d/P value which is 0.5 higher. On application of an electric voltage, however, the cholesteric pitch increases, and thus the lower limit of the d/P ratio increases. Although the same effect can also occur at the upper limit, this is virtually impossible to utilize since an undesired electro-optical effect in the form of a refractive-index grid, the so-called stripe transition, perpendicular to the director orientation in the centre of a liquid-crystal layer occurs on application of an electric voltage in the region of relatively high doping. This effect significantly reduces the upper limit of possible doping and is usually, in particular in the case of relatively high twist angles, much more pronounced than the increase in the lower limit on application of the voltage.

For fault-free operation of STN displays, however, a uniform transition of the liquid-crystal layer from the initial alignment to the final alignment, if possible over the entire display area, but at least over a pixel, is required. During this transition, the director of the liquid-crystal layer within each imaginary parallel sub-layer, irrespective of the location, moves toward one another in the same direction and at the same angle. This transition is also known as the Freedericksz transition. However, this desired transition does not occur for all possible parameter combinations. Depending both on the properties of the liquid crystal and on the design of the display, an undesired transition known, owing to its optical appearance, as striped domain transition/distortion, occurs on application of an electric voltage. This transition takes precedence over the desired Freedericksz transition if the liquid-crystal parameters, in particular the elastic constants and the dielectric anisotropy, are favorable for a steep electro-optical characteristic line. It is furthermore favoured by a large d/P ratio and depends not least on the twist angle used and the surface tilt angle. The larger the twist angle, the greater the surface tilt angle has to be in order to enable stable operation of the display. Tilt angles of at least 2°, 3° or 4 to 5° are typically used at the twist angles of 180°, 220° and 240° that are generally frequently used.

Since the operating voltage in displays, i.e. also in displays with these effects, should generally be as low as possible, use is made of liquid-crystal media of high dielectric anisotropy, which generally consist predominantly and usually even very substantially of liquid-crystal compounds having the corresponding dielectric anisotropy, i.e. compounds of positive dielectric anisotropy in the case of dielectrically positive media. If need be, significant amounts of dielectrically neutral liquid-crystal compounds are typically employed. Liquid-crystal compounds with the sign of the dielectric anisotropy opposite to the dielectric anisotropy of the medium are generally employed extremely sparingly or not at all.

An exception is formed here by STN displays, which are also the subject-matter of the present application. In STN displays, dielectrically positive liquid-crystal media which comprise dielectrically negative liquid-crystal compounds can be employed, for example in accordance with DE 41 00 287, in order to increase the steepness of the electro-optical characteristic line.

The pixels of the liquid-crystal displays can be addressed directly, time-sequentially, i.e. in time multiplex mode, or by means of a matrix of active, electrically nonlinear elements.

In STN displays, addressing in time multiplex mode is the most wide-spread. In this mode, the columns and rows of a matrix-form arrangement of liquid-crystal switching elements are addressed by means of an addressing scheme, for example in accordance with Alt and Pleschko. In this case, the liquid-crystal medium of the liquid-crystal display elements reacts to the root mean square (rms) of the addressing voltage. Particularly at relatively high multiplex ratios and in the case of very fast-switching liquid-crystal switching elements, however, this no longer applies. The addressing here can alternatively be carried out by "multi line addressing" or by means of "active addressing".

The term "low multiplex drive" is commonly used for multiplex ratios of 1:32 or less, the term "mid multiplex drive" is commonly used for multiplex ratios in the range from about 1:64 to 1:100, and the term "high multiplex drive" is commonly used for multiplex ratios of about 1:200 or more (for example 1:240, 1:400 or 1:480).

Liquid-crystal comprising compounds of the formula

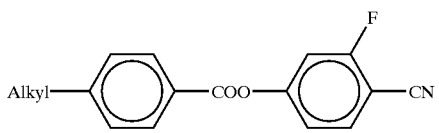

are disclosed in various publications, for example in EP 0 533 988 and DE 197 46 793. However, they have low clearing points at the same time as high viscosities, poor solubility and a low ratio of the elastic constants $k_3/k_1$.

Liquid-crystal media comprising compounds of the formula

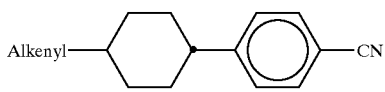

are disclosed in various publications, for example in U.S. Pat. No. 4,676,604. However, they have only moderate dielectric anisotropy.

It can thus be seen that there is a demand for liquid-crystal media having a high clearing point, low threshold voltage, low viscosity and large steepness of the electro-optical characteristic line.

There thus has been and is a great demand for liquid-crystal media which do not have the disadvantages of the media from the prior art, or at least do so to a significantly reduced extent, and which, in particular, have a low threshold voltage and a steep characteristic line.

This is achieved by the liquid-crystal media according to the invention, which in each case comprise one or more compound(s) of the formula I and one or more compound(s) of the formula II

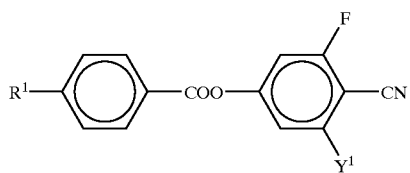

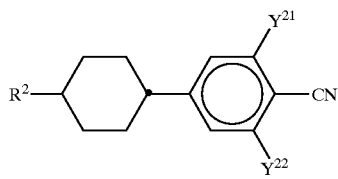

in which $R^1$ is alkyl or alkoxy having from 1 to 7 carbon atoms, preferably n-alkyl or n-alkoxy, particularly preferably having from 2 to 5 carbon atoms, or alkoxyalkyl, alkenyl or alkenyloxy having from 2 to 7 carbon atoms, preferably 1E-alkenyl, 1-alkenyloxy or straight-chain alkoxyalkyl, preferably having from 2 to 5 carbon atoms, and particularly preferably alkyl or alkoxyalkyl, and $Y^1$ is H or F, preferably H, $R^2$ is alkenyl or alkenyloxy having from 2 to 7 carbon atoms, preferably alkenyl, and $Y^{21}$ and $Y^{22}$ are each, independently of one another, H or F, preferably at least one is H, particularly preferably both are H.

In a preferred embodiment, the liquid-crystal media according to the present invention comprise a) one or more highly dielectrically positive compound(s) of the formula (I)

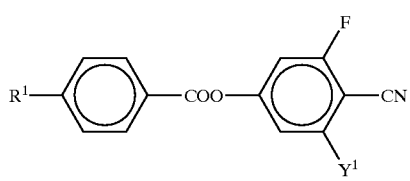

in which $R^1$ and $Y^1$ are as defined under the formula I, b) one or more dielectrically positive compound(s) of the formula II

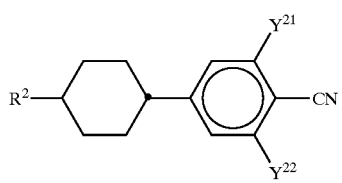

in which

R², Y²¹ and Y²² are as defined above under the formula II, and c) one or more compound(s) of the formula III

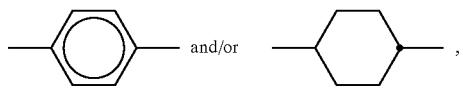
III in which

R³¹ and R³² are each, independently of one another, as defined above for R¹ under the formula I, and Z³¹, Z³² and Z³³ are each, independently of one another, —CH₂CH₂—, —CH=CH—, —COO— or a single bond,

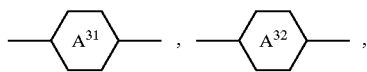,

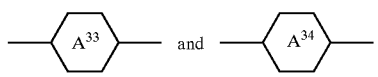

are each, independently of one another,

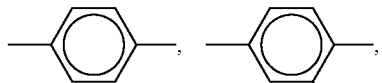

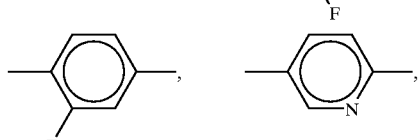

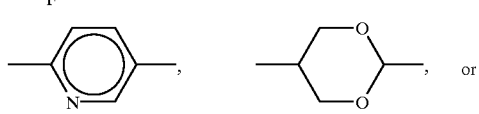
or o and p, independently of one another, are 0 or 1, but preferably

R³¹ and R³² are each, independently of one another, alkyl or alkoxy having 1–5 carbon atoms or alkenyl having 2–5 carbon atoms,

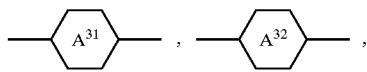,

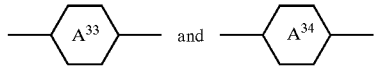

are each, independently of one another,  or

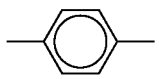

and very particularly preferably at least two of these rings are

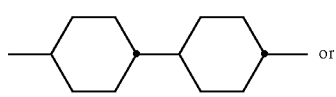

where very particularly preferably two adjacent rings are linked directly, preferably

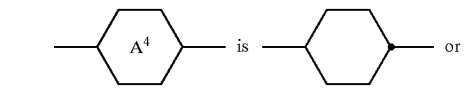

The compounds of the formula III are dielectrically neutral compounds having moderate optical anisotropy values.

In a further preferred embodiment, the liquid-crystal medium employed alternatively or additionally, preferably additionally, comprises one or more compound(s) of the formula IV

IV

R⁴¹ and R⁴² are each, independently of one another, alkyl or alkoxy having from 1 to 5 carbon atoms, preferably n-alkyl or n-alkoxy, preferably having from 1 to 5 carbon atoms, or alkoxyalkyl, alkenyl, alkynyl or alkenyloxy having from 2 to 7 carbon atoms, preferably straight-chain alkoxyalkyl, 1E-alkenyl or 1E-alkenyloxy, preferably having from 1 to 5 carbon atoms,

,

Z⁴ is COO, CH₂CH₂, —C≡C— or preferably a single bond, where the phenyl rings, independently of one another, may optionally be monosubstituted or disubstituted by F, and n⁴ is 0, 1 or 2, preferably 0 or 1, more preferably 1.

The liquid-crystal medium preferably comprises one or more compound(s) of the formula V

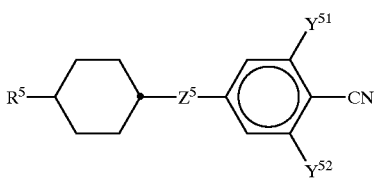

V in which
- $R^5$ is alkyl having from 1 to 9 carbon atoms, preferably n-alkyl, preferably having from 2 to 7 carbon atoms,
- $Z^5$ is —CH$_2$CH$_2$—, —COO— or a single bond, preferably —CH$_2$CH$_2$— or a single bond, particularly preferably a single bond, and
- $Y^{51}$ and $Y^{52}$ are each, independently of one another, H or F, preferably one is H and the other is F or both are F, particularly preferably both are H.

The liquid-crystal medium optionally comprises one or more compound(s) of the formula VI

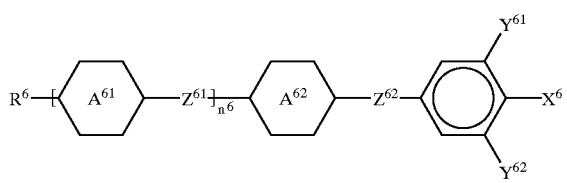

VI in which
$R^6$ is as defined above for $R^1$ under the formula I,

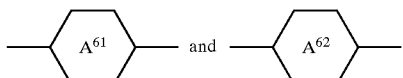

are each, independently of one another,

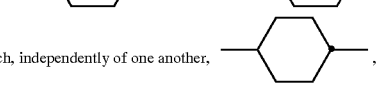

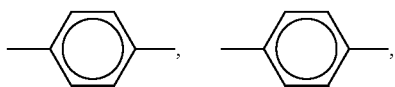

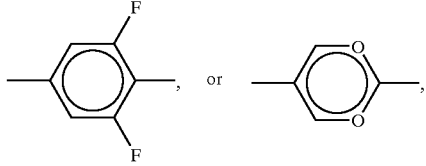

$Z^{61}$ and $Z^{62}$ are each, independently of one another, —CH$_2$—CH$_2$—, —CH=CH—, —COO— or a single bond,
$X^6$ is F, Cl, OCF$_2$H, OCF$_3$ or CF$_3$,
$Y^{61}$ and $Y^{62}$ are each, independently of one another, H or F, and
$n^6$ is 0, 1 or 2, preferably 0 or 1.

Particular preference is given to liquid-crystal media which comprise one or more compound(s) of the formula I selected from the group consisting of the compounds of the sub-formulae I1 to I3

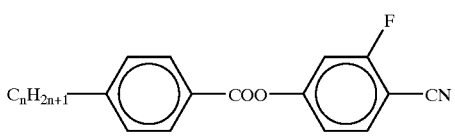

I1

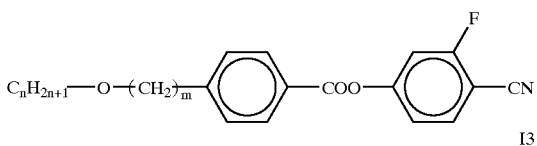

I2

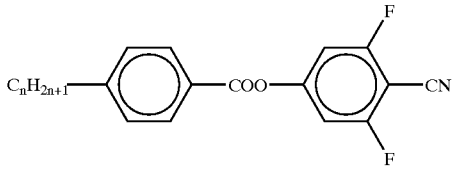

I3 in which
n is from 1 to 9, preferably from 2 to 7, and
m is from 1 to 3

The liquid-crystal media according to the invention preferably comprise one or more compound(s) of the formula II selected from the group consisting of the compounds of the sub-formulae II1 to II4

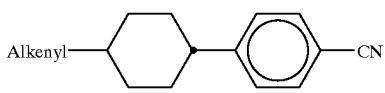

II1

II2

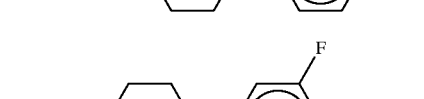

II3

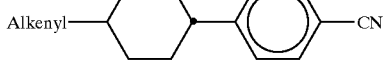

II4 in which
Alkenyl is $C_{n^2}H_{2n^2+1}$—CH=CH—(CH$_2$)$_{m^2}$,
$n^2$ is from 0 to 5,
$m^2$ is from 0 to 5, and
$n^2+m^2$ is from 0 to 5

The liquid-crystal medium particularly preferably comprises one or more compound(s) selected from the group consisting of the compounds of the formulae III1 to III3:

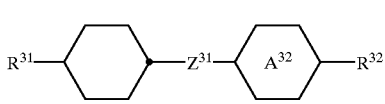

III1

III2
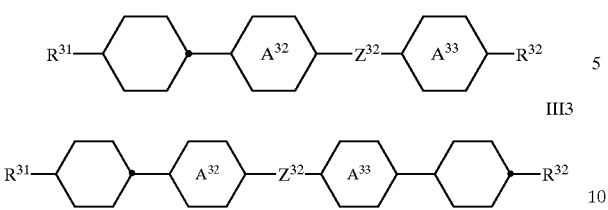

III3
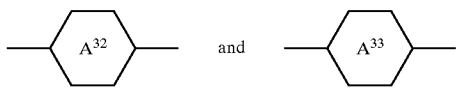

in which $R^{31}$ $R^{32}$, $Z^{31}$, $Z^{32}$,

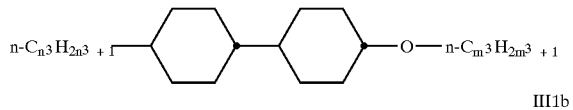 and 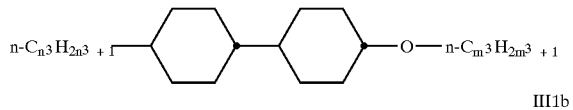

are each as defined above under the formula III.

The liquid-crystal medium especially preferably comprises one or more compound(s) selected from the group consisting of the compounds of the formulae III1a to III1d, III2a to III2e, III3a to III3c and III4a:

III1a
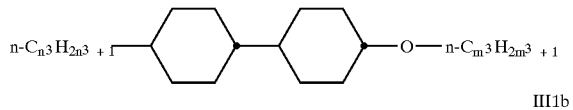

III1b
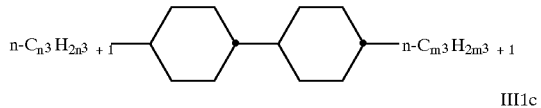

III1c
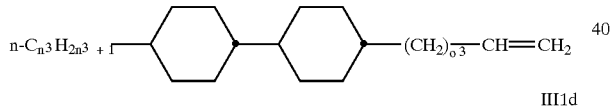

III1d
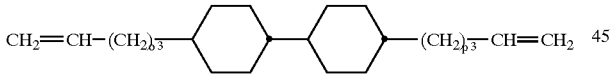

in which $n^3$ and $m^3$ are each, independently of one another, from 1 to 5, and $o^3$ and $p^3$ are each, independently thereof and from one another, are from 0 to 3, III2a
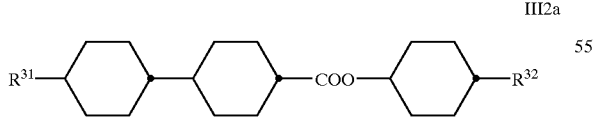

III2b
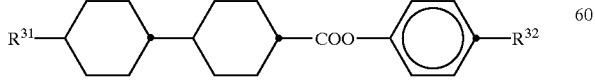

III2c
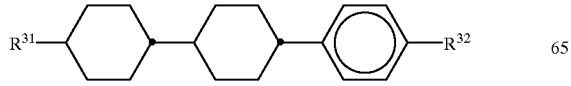

III2d
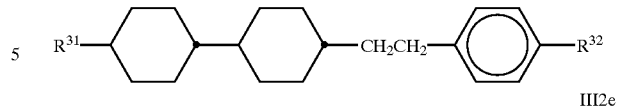

III2e
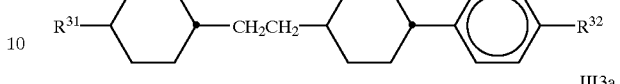

III3a
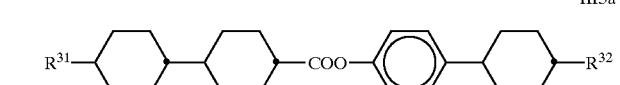

III3b
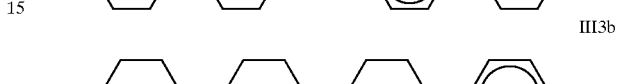

III3c
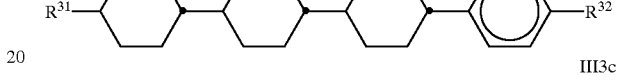

III4a
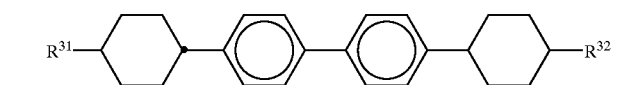

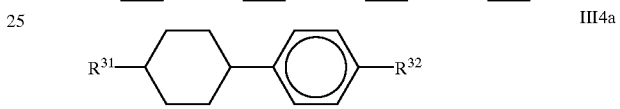

in which $R^{31}$ and $R^{33}$ are each as defined above under the formula III1, and the phenyl rings may optionally be fluorinated, but not in such a way that the compounds are identical with those of the formula II and its sub-formulae. $R^{31}$ is preferably n-alkyl having from 1 to 5 carbon atoms, particularly preferably having from 1 to 3 carbon atoms, and $R^{32}$ is preferably n-alkyl or n-alkoxy having from 1 to 5 carbon atoms or alkenyl having from 2 to 5 carbon atoms. Of these, particular preference is given to the compounds of the formulae III1a to III1d.

The liquid-crystal medium preferably comprises one or more compound(s) selected from the group consisting of the compounds of the formulae IV1a to IV1c and IV2a to IV2d:

IV1a
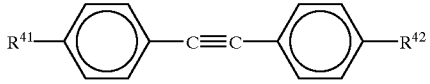

IV1b
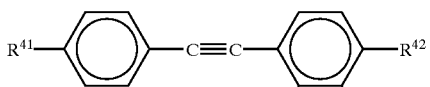

IV1c

IV2a
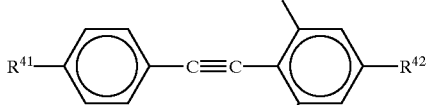

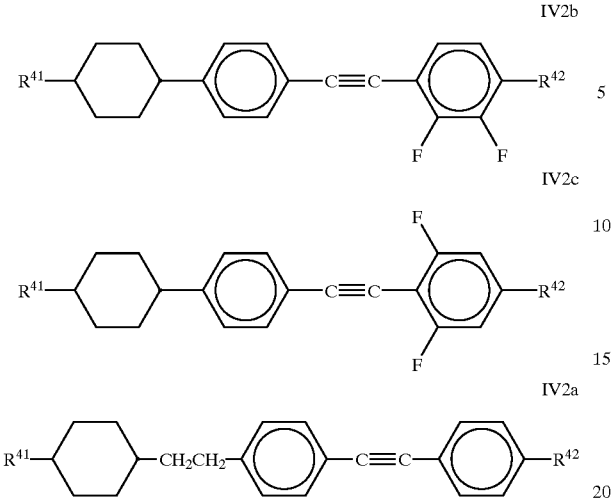

in which
$R^{41}$ and $R^{42}$ are as defined above under the formula IV.

The liquid-crystal medium preferably comprises one or more compound(s) selected from the group consisting of the compounds of the formulae V1a to V1c and V2a to V2c:

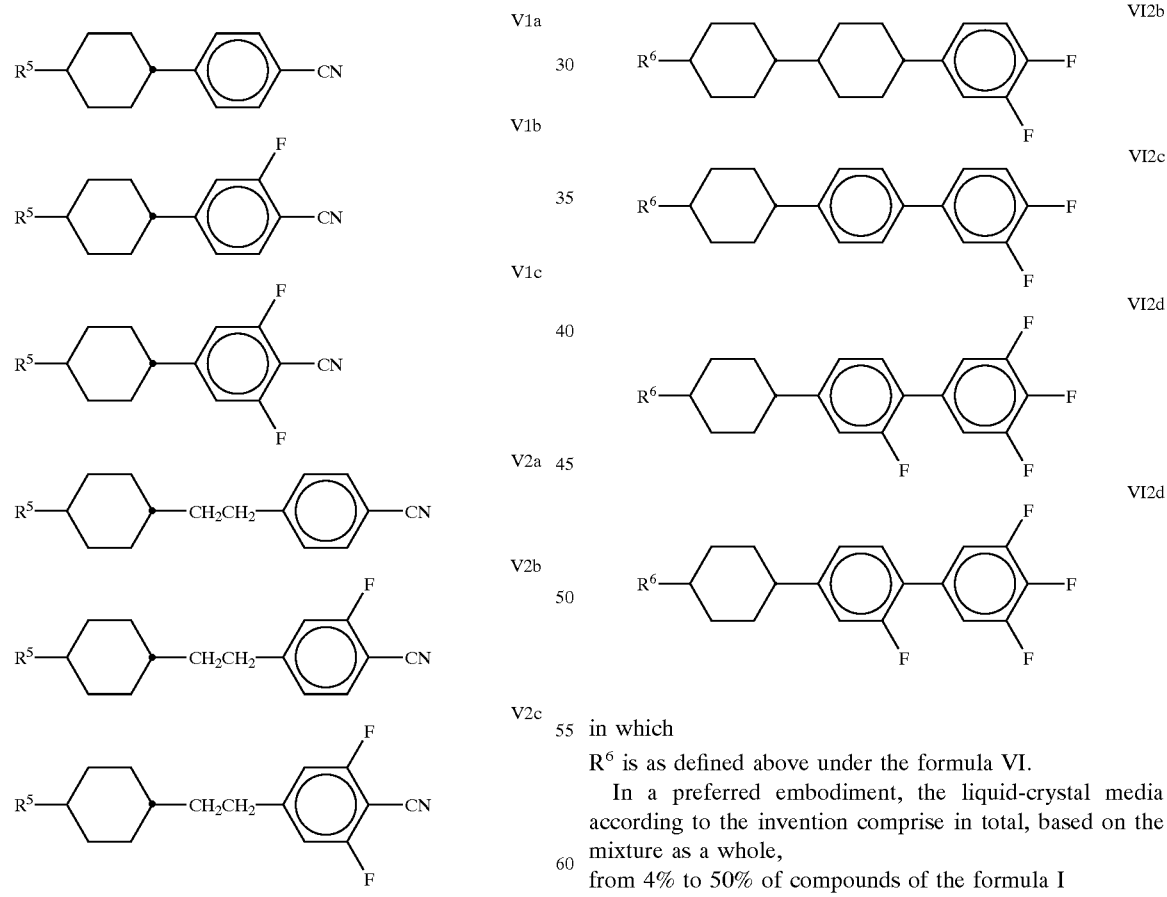

in which
$R^5$ is as defined above under the formula V.

The liquid-crystal medium preferably comprises one or more compound(s) selected from the group consisting of the compounds of the formulae VI1a to VI1d and VI2a to VI2d:

in which
$R^6$ is as defined above under the formula VI.

In a preferred embodiment, the liquid-crystal media according to the invention comprise in total, based on the mixture as a whole,
from 4% to 50% of compounds of the formula I
from 10% to 45% of compounds of the formula II, and
from 12% to 45% of compounds of the formula III.

Here, as throughout the present application, the term "compounds", for clarification also written as compound(s), is taken to mean both one compound and a plurality of compounds, unless expressly stated otherwise.

The individual compounds here are generally employed in concentrations of from 1% to 30%, preferably from 2% to 20% and particularly preferably from 4% to 16%.

In a preferred embodiment, the liquid-crystal media particularly preferably comprise in total
from 5% to 45% of compounds of the formula I,
from 14% to 40% of compounds of the formula II,
from 15% to 40% of compounds of the formula III,
from 0% to 30% of compounds of the formula IV,
from 0% to 25% of compounds of the formula V, and
from 4% to 40% of compounds of the formula VI.

The liquid-crystal media in this embodiment very particular preferably comprise in total
from 8% to 35% of compounds of the formula I,
from 20% to 35% of compounds of the formula II,
from 20% to 35% of compounds of the formula III,
from 2% to 23% of compounds of the formula IV,
from 0% to 20% of compounds of the formula V, and
from 8% to 35% of compounds of the formula VI.

In a particularly preferred embodiment, which may be identical to and preferably is identical to the preferred embodiments described above for the preferred concentrations ranges, the liquid-crystal media comprise one or more compounds of the formula I1 and/or one or more compounds of the formula II1 and/or one or more compounds selected from the group consisting of the compounds of the formulae III1a to III1c and/or one or more compounds selected from the group consisting of the compounds of the formulae III2 to III3.

Particular preference is given here to liquid-crystal media which comprise one or more compounds of the formula I1, in particular in each case in concentrations of from 2% to 15% per compound, one or more compounds of the formula II1, in particular in each case in concentrations of from 5% to 30% per compound, one or more compounds of the formula III1, preferably selected from the group consisting of the compounds of the formulae III1a to III1d, in particular in each case in concentrations of from 3% to 25% per compound, one or more compounds of the formula III2, in particular in each case in concentrations of from 3% to 12% per compound, preferably in each case at least one compound in which R is alkyl, one or more compounds of the formulae III1a and/or III1c, in particular in concentrations of from 4% to 25% per compound, preferably in each case at least one compound each of the formulae III1a and III1c, one or more compounds of the formula III2a, one or more compound(s) of the formula VI2b, particularly preferably those in which $R^6$ is alkenyl.

The liquid-crystal media according to the invention preferably have nematic phases of in each case at least from 0° C. to 70° C., preferably from −30° C. to 80° C. and very particularly preferably from −40° C. to 85° C. The clearing point of the media is particularly preferably 90° C. The term "have a nematic phase" here means firstly that no smectic phase and no crystallization are observed at low temperatures at the corresponding temperature and secondly that no clearing occurs on heating from the nematic phase. The investigation at low temperatures is carried out in a flow viscometer at the corresponding temperature and checked by storage for at least 100 hours in test cells having a layer thickness corresponding to the electro-optical application. At high temperatures, the clearing point is measured by conventional methods in capillaries.

Furthermore, the liquid-crystal media used in accordance with the invention are characterized by optical anisotropy values which are particularly suitable for STN displays having conventional layer thicknesses. The birefringence values are in the range from equal to 0.100 to 0.180, preferably in the range from 0.120 to 0.170 and very particularly preferably in the range from 0.120 to 0.160 and most preferably in the range from 0.130 to 0.150.

In addition, the liquid-crystal displays according to the invention have relatively low Freedericksz threshold voltage values of less than or equal to 3.0 V, preferably less than or equal to 2.7 V, particularly preferably less than or equal to 2.6 V and very particularly preferably less than or equal to 2.5 V.

These preferred values of the individual physical properties are preferably also observed in each case combined with one another. Thus, media according to the invention have, in particular, the following property combinations:

|  | Phase: T /° C. | Δn | Threshold (240°/5°) /V |
|---|---|---|---|
| according to the invention | ≦−20 to ≧80 | 0.12 ≦ to ≦0.18 | ≦2.0 |
| preferably | ≦−30 to ≧90 | 0.13 ≦ to ≦0.17 | ≦1.9 |
| particularly preferably | ≦−40 to ≧100 | 0.14 ≦ to ≦0.07 | ≦1.8 | where here, as throughout the application, , "≦" means less than or equal to and "≧" means greater than or equal to.

The above-mentioned preferred concentration ranges particularly preferably also apply to this preferred combination of compounds.

The term "alkyl" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" preferably covers straight-chain and branched alkenyl groups having 2–7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or alkoxyalkyl preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of the parameters of the compounds, in particular of $R^{11}$, $R^{12}$, $R^{21}$, $R^{22}$, $R^{31}$, $R^{32}$, $L^1$ and $L^2$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with the single covalent bond. Higher values of $k_{33}/k_{11}$ facilitate, for example, flatter transmission characteristic lines in TN cells with a 90° twist (for achieving grey shades) and steeper transmission characteristic lines in STN, SBE and OMI cells (greater multiplexability), and vice versa.

In the present application, the term "dielectrically very highly positive compounds" denotes compounds having a $\Delta\epsilon$ of >20, the term "dielectrically highly positive compounds" denotes compounds having a $\Delta\epsilon$ in the range from less than 20 to $\Delta\epsilon=10$, the term "dielectrically slightly positive compounds" denotes compounds having a $\Delta\epsilon$ in the range from less than 10 to $\Delta\epsilon>1.5$, the term "dielectrically neutral compounds" denotes those in which $-1.5 \leq \Delta\epsilon \leq 1.5$, and the term "dielectrically negative compounds" denotes those in which $\Delta\epsilon$ is <−1.5. The dielectric anisotropy of the compounds is determined here by dissolving 10% of the compounds in a liquid-crystalline host and determining the capacitance of this mixture in at least one test cell in each case with a thickness of 10 μm with homeotropic and with homogeneous surface alignment at 1 kHz. The measurement voltage is typically 0.3 V, but it is also possible to use from 0.5 V to 1.0 V. However, the measurement voltage is always less than the capacitive threshold of the respective liquid-crystal mixture. The host mixture used for dielectrically positive compounds is ZLI-4792, and the host mixture used for dielectrically neutral and dielectrically negative compounds is ZLI-3086, both from Merck KGaA, Germany. The values for the respective compounds to be investigated are obtained from the change in the dielectric constants of the host mixture after addition of the compound to be investigated and extrapolation to 100% of the compound employed.

The term "threshold voltage" usually relates to the optical threshold for 10% relative contrast ($V_{10}$).

All concentrations in this application, unless explicitly stated otherwise, are given in percent by weight and relate to the corresponding mixture as a whole. All physical properties are and were determined in accordance with "Merck Liquid Crystals, Physical Properties of Liquid Crystals", as of November. 1997, Merck KGaA, Germany, and apply for a temperature of 20° C., unless explicitly stated otherwise. $\Delta$n is determined at 589 nm and $\Delta\epsilon$ at 1 kHz.

The threshold voltages and the other electro-optical properties were determined in test cells manufactured at Merck KGaA, Germany, using white light and using a commercial measuring instrument, for example LCD 5000 from Otsuka, Japan. The alignment layer(s) used was (were) various polyimides (the standard alignment layer was SE 4110) from Nissan Chemicals, Japan. The cells were selected, depending on $\Delta$n of the liquid crystals, having a thickness corresponding to an optical retardation d·$\Delta$n of the cells of about 0.85 μm. The cells had a twist angle of 240°. The d/P value was set at 0.53 by means of the likewise chiral dopant S-811 (Merck KGaA, Darmstadt, Germany). The cells were operated in so-called "yellow mode". The characteristic voltages were all determined with perpendicular observation. The threshold voltage was indicated as $V_{10}$ for 10% relative contrast, the mid-grey voltage $V_{50}$ was indicated for 50% relative contrast and the saturation voltage $V_{90}$ was indicated for 90% relative contrast.

In the case of some liquid-crystal media, the threshold voltage was additionally determined as the capacitive threshold $V_0$ (also known as the Freedericksz threshold).

The surface tilt angle was determined using the method of rotation of an anisotropic crystal in an HeNe laser beam. The interference image of a cell having a liquid-crystal layer thickness of 50 μm which had been rubbed in an antiparallel manner and filled with ZLI-2293 from Merck KgaA, Germany, was recorded using a detector, and the surface tilt angle was calculated from the angle of symmetry.

The liquid-crystal media according to the invention may, if desired, also comprise furthermore additives in the conventional amounts. The amount of these additives employed, like that of the chiral dopants, is in total from 0% to 10%, based on the amount of the mixture as a whole, preferably from 0.1% to 6%. The concentrations of the individual compounds employed are preferably from 0.1 to 3%. The concentration of these and similar additives is not taken into account when specifying the concentrations and the concentration ranges of the liquid-crystal compounds in the liquid-crystal media.

The compositions consist of a plurality of compounds, preferably from 3 to 30, particularly preferably from 6 to 20 and very particularly preferably from 10 to 16 compounds, which are mixed in a conventional manner. In general, the desired amount of the components used in lesser amount are dissolved in the components making up the principal constituent, advantageously at elevated temperature. If the selected temperature is above the clearing point of the principal constituent, the completeness of the dissolution process is particularly easy to observe. However, it is also possible to prepare the liquid-crystal mixtures by other conventional methods, for example using premixes or from so-called "multibottle systems".

By means of suitable additives, the liquid-crystal phases according to the invention can be modified in such a way that they can be employed in any type of ECB display and in particular of PA LCDs, as well as IPS display that has been disclosed hitherto.

In the examples, the melting point T (C,N), the transition from the smectic (S) to the nematic (N) phase T(S,N) and the clearing point T (N,I) of a liquid-crystal substance are given in degrees Celsius. The percentages are, unless explicitly stated otherwise, percent by weight above and below, and the physical properties are the values at 20° C., unless explicitly stated otherwise.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

All temperature differences are correspondingly differential degrees, unless explicitly stated otherwise.

The entire disclosure of all applications, patents and publications, cited above, and of corresponding German Application No. 100 53 285.3, filed Oct. 27, 2000 is hereby incorporated by reference.

In the present application and in the following examples, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $Oc_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$.F | $C_nH_{2n+1}$ | OCF$_3$ | H | F |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | H | F |
| nOCF$_2$.F.F | $C_nH_{2n+1}$ | OCHF$_2$ | F | F |
| nS | $C_nH_{2n+1}$ | NCS | H | H |
| nVsN | $C_rH_{2r+1}$—CH=CH—$C_sH_{2s}$— | CN | H | H |
| nEsN | $C_rH_{2r+1}$—O—$C_sH_{2s}$— | CN | H | H |
| nAm | $C_nH_{2n+1}$ | $COOC_mH_{2m+1}$ | H | H |

TABLE A

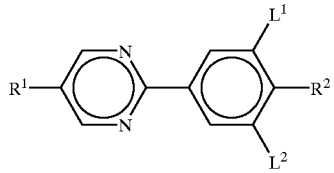

PYP

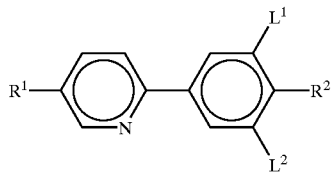

PYRP

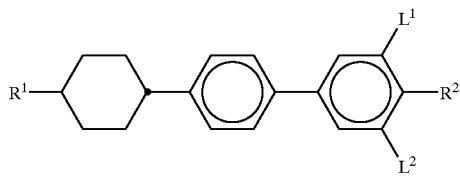

BCH

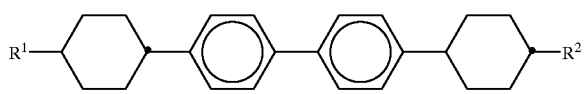

CBC

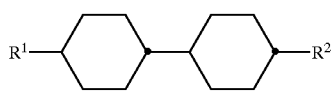

CCH

TABLE A-continued
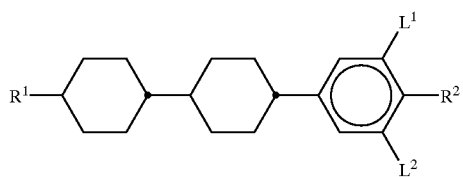
CCP
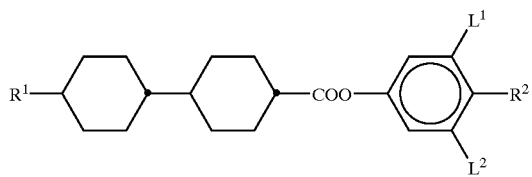
CP
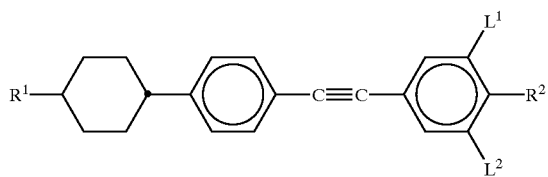
CPTP
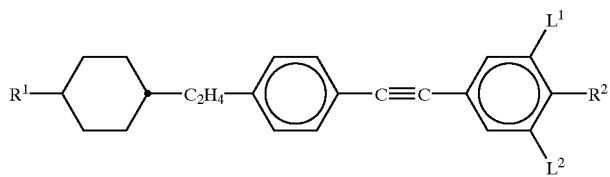
CEPTP
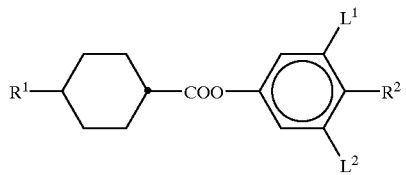
D
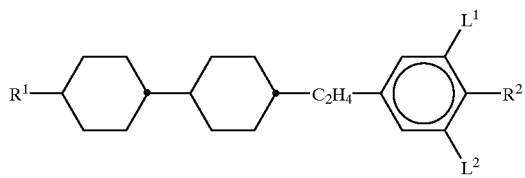
ECCP
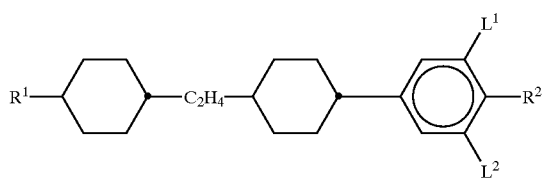
CECP TABLE A-continued
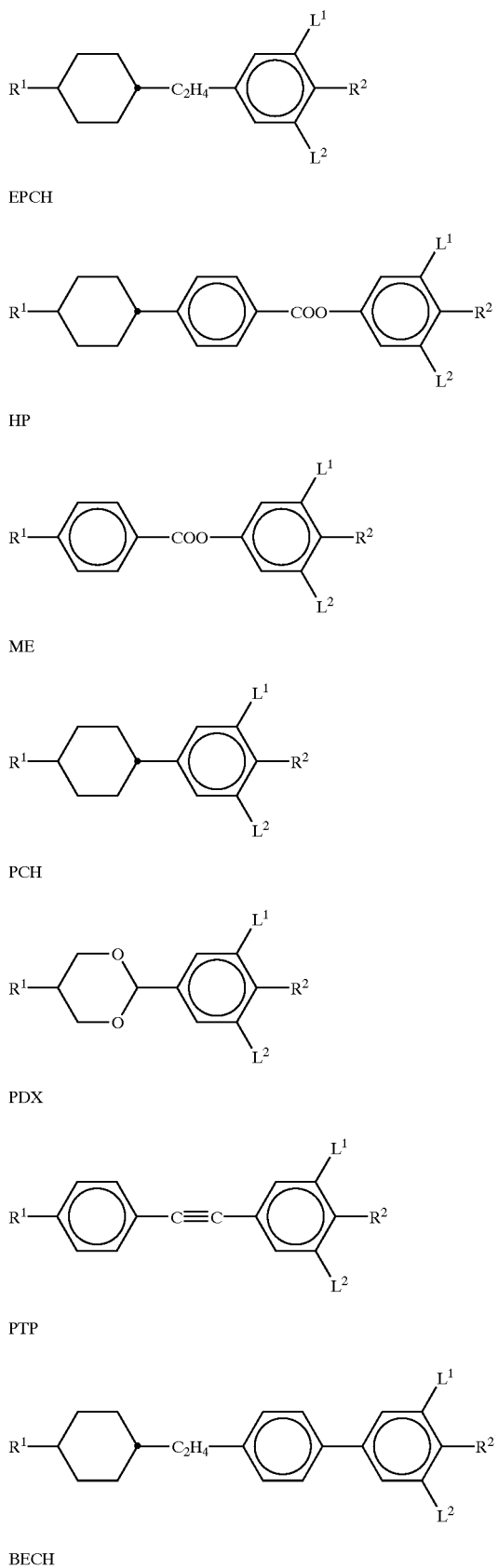
EPCH
HP
ME
PCH
PDX
PTP
BECH

TABLE A-continued
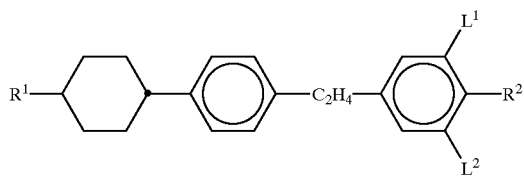
EBCH
CPC
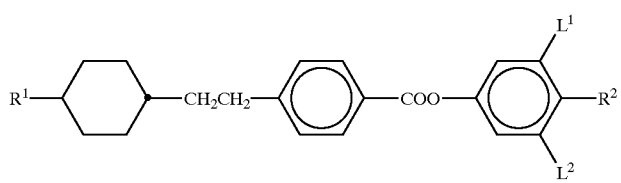
EHP
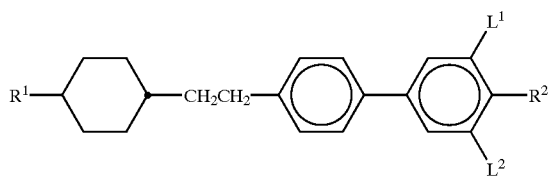
BEP
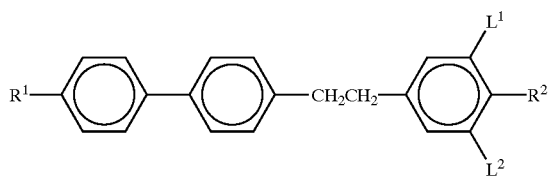
ET
TABLE B
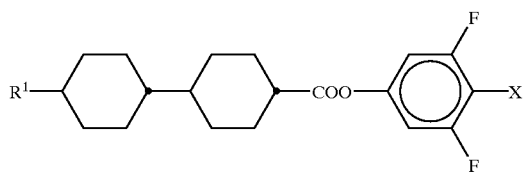
CCZU-n-X
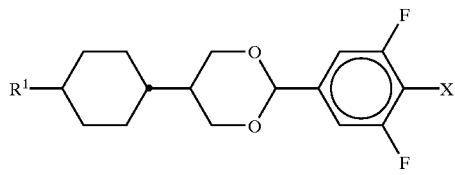
CDU-n-X TABLE B-continued
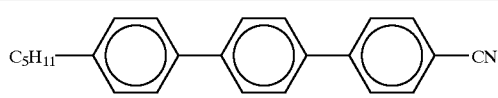
T15
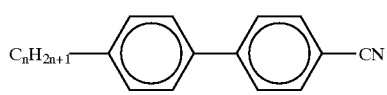
K3-n
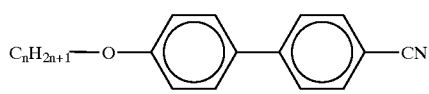
M3-n
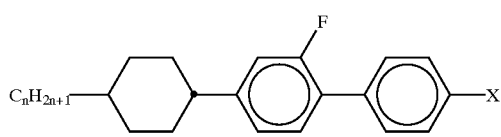
CGP-n-X
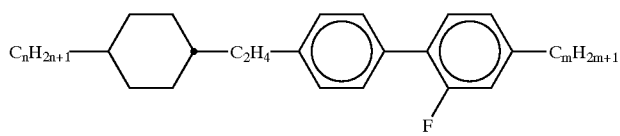
Inm
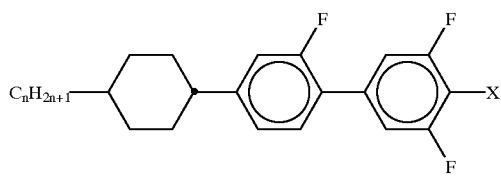
CGU-n-X
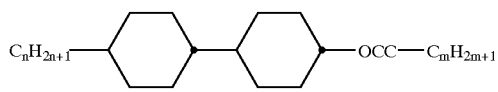
C-nm
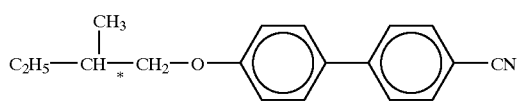
C15
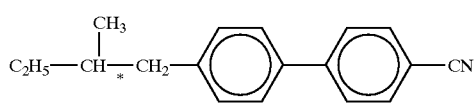
CB15

TABLE B-continued
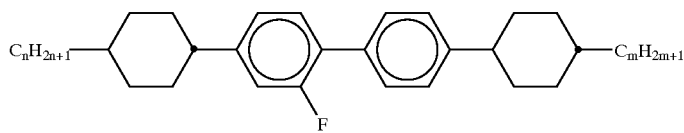
CBC-nmF
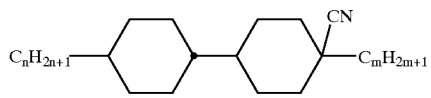
CCN-nm
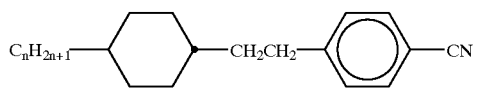
G3-n
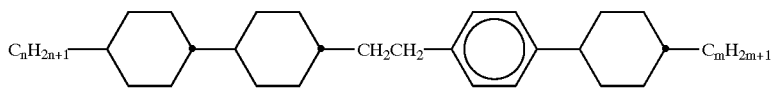
CCEPC-nm
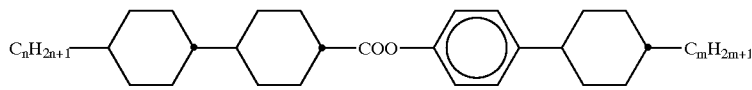
CCPC-nm
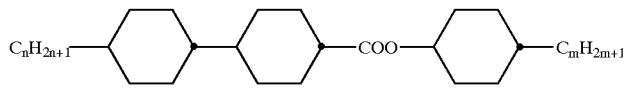
CH-nm
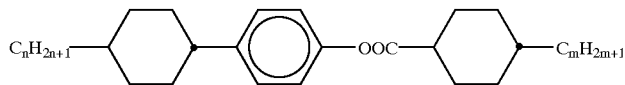
HD-nm
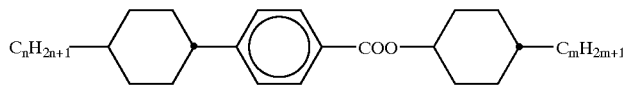
HH-nm
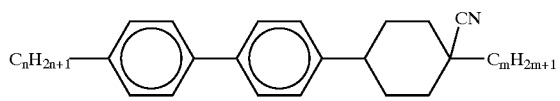
NCB-nm
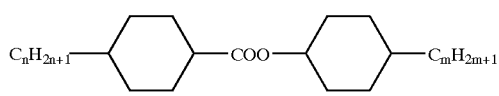
OS-nm TABLE B-continued
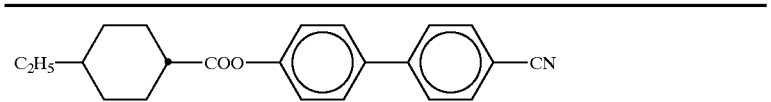
CHE
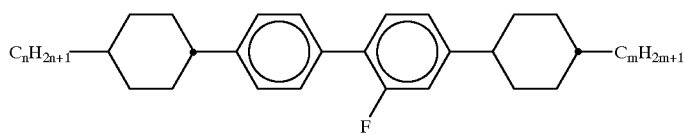
CBC-nmF
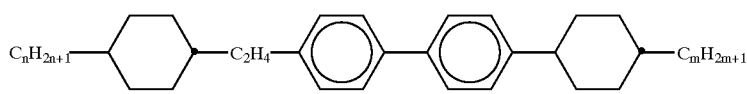
ECBC-nm
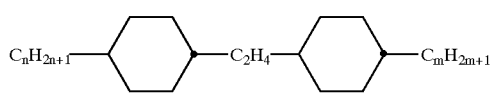
ECCH-nm
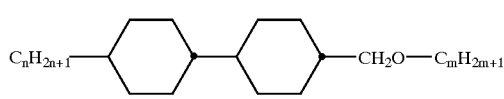
CCH-n1Em
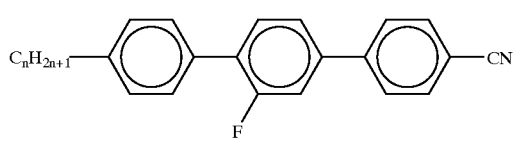
T-nFN
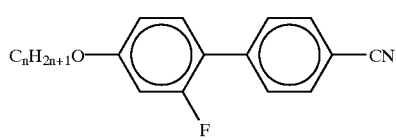
B-nO.FN
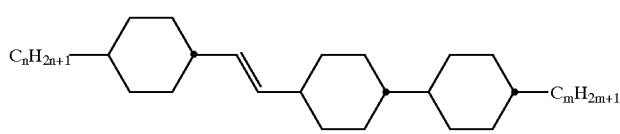
CVCC-n-m
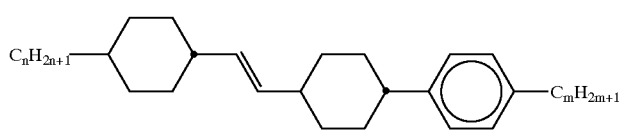
CVCP-n-m TABLE B-continued
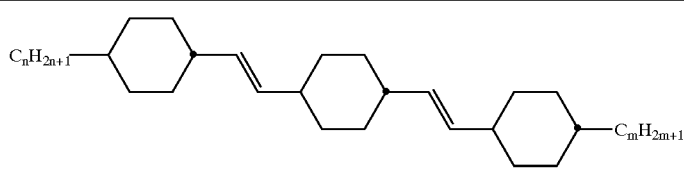
CVCVC-n-m
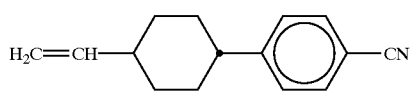
CP-V-N
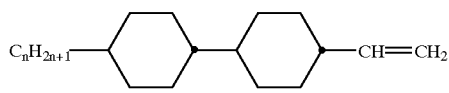
CC-n-V
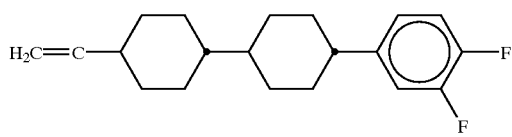
CCG-V-F
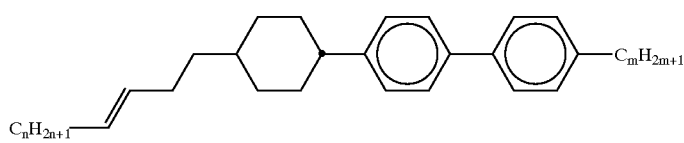
CPP-nV2-m
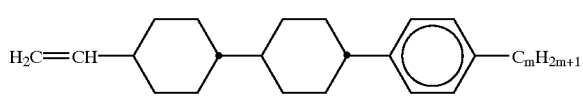
CCP-V-m
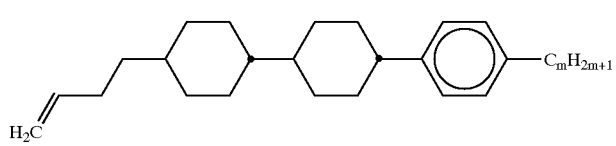
CCP-V2-m
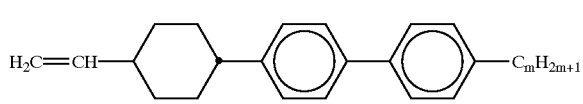
CPP-V-m
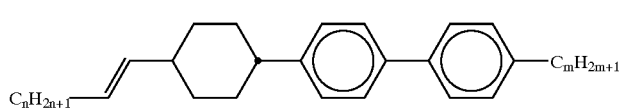
CPP-nV-m TABLE B-continued
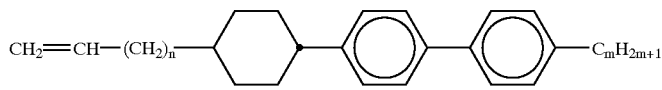
CPP-Vn-m
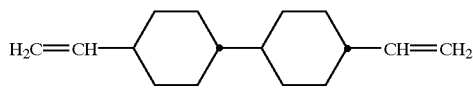
CC-V-V
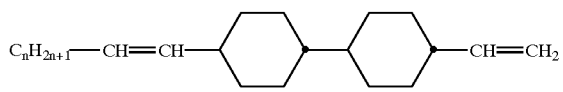
CC-nV-V
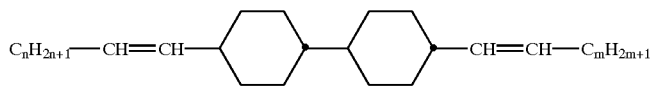
CC-nV-Vm
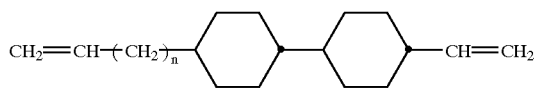
CC-Vn-V
CC-Vn-mV
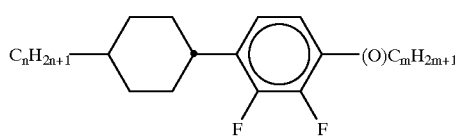
PCH-n(O)mFF
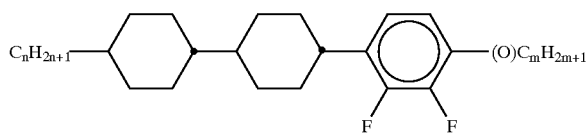
CCP-n(O)mFF
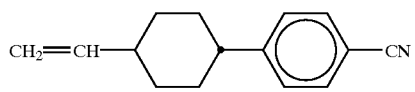
CP-V-N
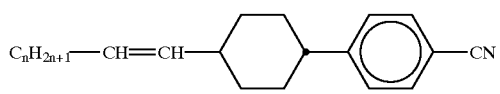
CP-nV-N

TABLE B-continued

CP-Vn-N

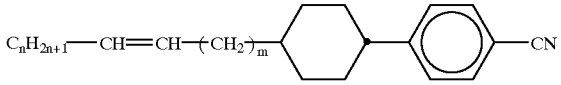

CP-nVm-N

EXAMPLE 1

A liquid-crystal mixture having the composition indicated in the following table was prepared and investigated in an STN display.

| Compound/ abbreviation | Concentration/ % | Physical properties |
|---|---|---|
| ME2N.F | 5.0 | Clearing point: T(N, I) = 101.6° C. |
| ME3N.F | 5.0 | $n_e$ (20° C., 589 nm) = 1.6404 |
| ME4N.F | 5.0 | $\Delta n$ (20° C., 589 nm) = 0.1443 |
| CP-1V-N | 25.0 | $HTP_{S-811}$ (20° C.) = −12.1 $\mu m^{-1}$ |
| CC-5-V | 16.0 | |
| CCP-V-1 | 5.0 | |
| CCG-V-F | 19.0 | |
| CCPC-33 | 5.0 | |
| CPTP-301 | 5.0 | $V_{10}$ (20° C.) = 1.76 V |
| CPTP-302 | 5.0 | $V_{50}$ (20° C.) = 1.81 V |
| CPTP-303 | 5.0 | $V_{90}$ (20° C.) = 1.83 V |
| Σ | 100.0 | $dV_{10}/dT$ (0–40° C.) = 3.43 mV/° C. |

The liquid-crystal medium has excellent applicational properties and is distinguished, in particular, by good contrast at high multiplex rates and at high operating temperatures.

EXAMPLE 2

| Compound/ abbreviation | Concentration/ % | Physical properties |
|---|---|---|
| ME2N.F | 5.0 | Clearing point: T(N, I) = 92.8° C. |
| ME3N.F | 5.0 | $n_e$ (20° C., 589 nm) = 1.6327 |
| PCH-3 | 15.0 | $\Delta n$ (20° C., 589 nm) = 0.1391 |
| CP-1V-N | 20.0 | $\epsilon_\parallel$ (20° C., 1 kHz) = 17.5 |
| CCG-V-F | 15.0 | $\Delta\epsilon$ (20° C., 1 kHz) = 12.9 |
| CC-5-V | 20.0 | $k_1$ (20° C.) = 11.2 pN |
| CCPC-33 | 5.0 | $k_3/k_1$ (20° C.) = 2.19 |
| CPTP-301 | 5.0 | $HTP_{S-811}$ (20° C.) = −11.9 $\mu m^{-1}$ |
| CPTP-302 | 5.0 | |
| CPTP-303 | 5.0 | $V_0$ (20° C.) = 1.00 V |
| Σ | 100.0 | $V_{10}$ (20° C.) = 1.85 V |
| | | $V_{50}$ (20° C.) = 1.89 V |
| | | $V_{90}$ (20° C.) = 1.82 V |
| | | $dV_{10}/dT$ (0–40° C.) = 4.50 mV/° C. |

The liquid-crystal medium has excellent applicational properties and is distinguished, in particular, by good steepness and by good contrast at high multiplex ratios.

EXAMPLE 3

| Compound/ abbreviation | Concentration/ % | Physical properties |
|---|---|---|
| ME2N.F | 5.0 | Clearing point: T(N, I) = 96.4° C. |
| ME3N.F | 5.0 | Transition: T(S, N) < −40° C. |
| PCH-3 | 13.0 | $n_e$ (20° C., 589 nm) = 1.6379 |
| CP-1V-N | 15.0 | $\Delta n$ (20° C., 589 nm) = 0.1429 |
| CP-V2-N | 10.0 | $\epsilon_\parallel$ (20° C., 1 kHz) = 17.9 |
| CCG-V-F | 15.0 | $\Delta\epsilon$ (20° C., 1 kHz) = 13.2 |
| CC-5-V | 15.0 | $k_1$ (20° C.) = 10.9 pN |
| CCPC-33 | 5.0 | $k_3/k_1$ (20° C.) = 2.17 |
| CCPC-34 | 3.0 | $HTP_{S-811}$(20° C.) = −12.0 $\mu m^{-1}$ |
| CPTP-301 | 5.0 | |
| CPTP-302 | 5.0 | $V_0$ (20° C.) = 0.98 V |
| CPTP-303 | 5.0 | $V_{10}$ (20° C.) = 1.83 V |
| Σ | 100.0 | $V_{50}$ (20° C.) = 1.87 V |
| | | $V_{90}$ (20° C.) = 1.89 V |
| | | $dV_{10}/dT$ (0–40° C.) = 4.33 mV/° C. |

The liquid-crystal medium has excellent applicational properties and is distinguished, in particular, by good steepness and by good contrast at high multiplex ratios.

EXAMPLE 4

| Compound/ abbreviation | Concentration/ % | Physical properties |
|---|---|---|
| ME2N.F | 5.0 | Clearing point: T(N, I) = 93.5° C. |
| ME3N.F | 5.0 | Transition: T(S, N) < −40° C. |
| ME4N.F | 10.0 | $n_e$ (20° C., 589 nm) = 1.6069 |
| ME5N.F | 10.0 | $\Delta n$ (20° C., 589 nm) = 0.1416 |
| CP-1V-N | 12.0 | $HTP_{S-811}$ (20° C.) = −13.1 $\mu m^{-1}$ |
| CP-V2-N | 19.0 | |
| CCG-V-F | 10.0 | |
| CCP-V-1 | 11.0 | |
| CPTP-302 | 2.0 | |
| CCPC-33 | 6.0 | $V_{10}$ (20° C.) = 1.38 V |
| CCPC-34 | 5.0 | $V_{50}$ (20° C.) = 1.40 V |
| CCPC-35 | 5.0 | $V_{90}$ (20° C.) = 1.42 V |
| Σ | 100.0 | $dV_{10}/dT$ (0–40° C.) = 2.50 mV/° C. |

The liquid-crystal medium has excellent applicational properties and is distinguished, in particular, by good contrast at high multiplex ratios and by low temperature dependence of the threshold and operating voltage.

COMPARATIVE EXAMPLE 1

| Compound/abbreviation | Concentration/% | Physical properties |
|---|---|---|
| PCH-2 | 7.0 | Clearing point: T(N, I) = 91.0° C. |
| PCH-3 | 18.0 | Transition: T(S, N) < −20° C. |
| PCH-4 | 14.0 | $n_e$ (20° C., 589 nm) = 1.6397 |
| PCH-5 | 15.0 | $\Delta n$ (20° C., 589 nm) = 0.1427 |
| PCH-7 | 7.0 | $\epsilon_\parallel$ (20° C., 1 kHz) = 15.4 |
| BCH-32 | 8.0 | $\Delta\epsilon$ (20° C., 1 kHz) = 11.2 |
| CPTP-301 | 4.0 | $\nu$ (20° C.) = 24 cSt |
| CPTP-302 | 4.0 | $k_1$ (20° C.) = 11.6 pN |
| CPTP-303 | 4.0 | $k_2$ (20° C.) = 6.8 pN |
| ECCP-3 | 7.0 | $k_3/k_1$ (20° C.) = 1.92 |
| ECCP-3F | 7.0 | $HTP_{S-811}$ (20° C.) = −11.2 $\mu m^{-1}$ |
| ECCP-5F | 7.0 | $V_0$ (20° C.) = 1.11 V |
| Σ | 100.0 | $V_{10}$ (20° C.) = 1.97 V |
| | | $V_{50}$ (20° C.) = 2.02 V |
| | | $V_{90}$ (20° C.) = 2.06 V |
| | | $dV_{10}/dT$ (0–40° C.) = 7.00 mV/° C. |

The liquid-crystal medium has at best adequate applicational properties and has, in particular, an unfavorable, large temperature dependence of the threshold and operating voltage.

COMPARATIVE EXAMPLE 2

| Compound/abbreviation | Concentration/% | Physical properties |
|---|---|---|
| ME2N.F | 4.0 | Clearing point: T (N, I) = 99.0° C. |
| ME3N.F | 4.0 | Transition T(S, N) < −40° C. |
| ME4N.F | 8.0 | $n_e$ (20° C., 589 nm) = 1.6431 |
| PCH-3 | 22.0 | $\Delta n$ (20° C., 589 nm) = 0.1431 |
| PTP-102 | 2.0 | $\epsilon_\parallel$ (20° C., 1 kHz) = 18.8 |
| CC-5-V | 5.0 | $\Delta\epsilon$ (20° C., 1 kHz) = 13.9 |
| CCP-V-1 | 15.0 | $\nu$ (20° C.) = 22 cSt |
| CCP-V2-1 | 7.0 | $\nu$ (−40° C.) = 17.200 cSt |
| CCG-V-F | 20.0 | $k_3/k_1$ (20° C.) = 2.05 |
| CPTP-301 | 4.0 | $HTP_{S-811}$ (20° C.) = −11.8 $\mu m^{-1}$ |
| CPTP-302 | 5.0 | $V_0$ (20° C.) = 0.97 V |
| CPTP-303 | 4.0 | $V_{10}$ (20° C.) = 1.77 V |
| Σ | 100.0 | $V_{50}$ (20° C.) = 1.83 V |
| | | $V_{90}$ (20° C.) = 1.85 V |
| | | $dV_{10}/dT$ (0–40° C.) = 3.25 mV/° C. |

The liquid-crystal medium has, like that in Example 1, at best adequate applicational properties and has at most moderate contrast.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystal medium comprising at least one compound of formula I and at least one compound of formula II

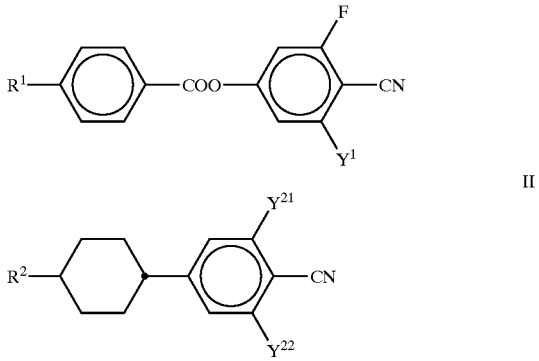

wherein
- $R^1$ is alkyl or alkoxy of 1 to 7 carbon atoms or alkoxyalkyl, alkenyl or alkenyloxy of 2 to 7 carbon atoms,
- $Y^1$ is H or F,
- $R^2$ is alkenyl or alkenyloxy of 3 to 7 carbon atoms, and
- $Y^{21}$ and $Y^{22}$ are each independently H or F.

2. The medium according to claim 1, further comprising at least one compound of formula III

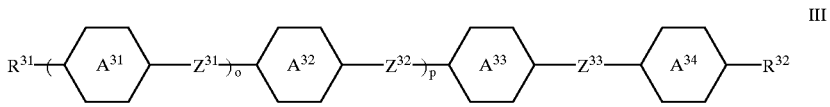

wherein
- $R^{31}$ and $R^{32}$ are each independently as defined for $R^1$ in formula I, an
- $Z^{31}$, $Z^{32}$ and $Z^{33}$ are each independently —$CH_2CH_2$—, —CH=CH—, —COO— or a single bond,

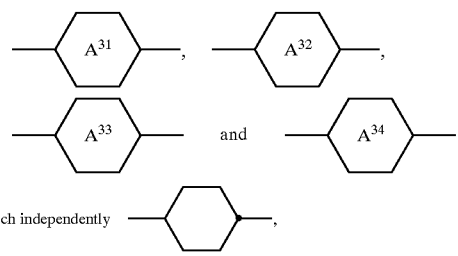

are each independently

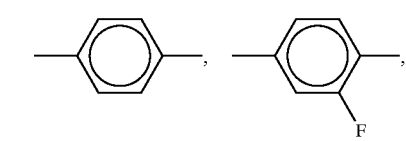

-continued

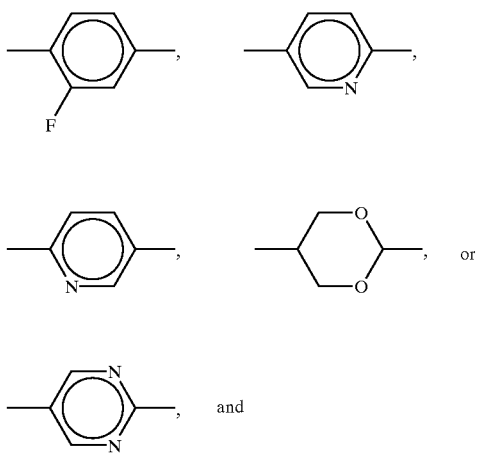

o and p, are each independently 0 or 1.

3. The medium according to claim 1, further comprising at least one compound of formula I1

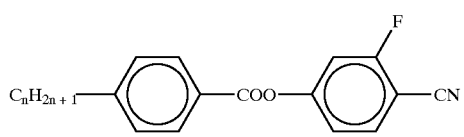

wherein n is 1 to 7.

4. The medium according to claim 1, further comprising at least one compound of formula IV,

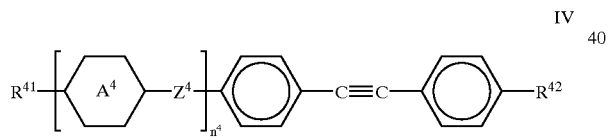

wherein $R^{41}$ and $R^{42}$ are each independently alkyl or alkoxy of 1 to 5 carbon atoms, or alkoxyalkyl, alkenyl, alkynyl or alkenyloxy of 2 to 7 carbon atoms,

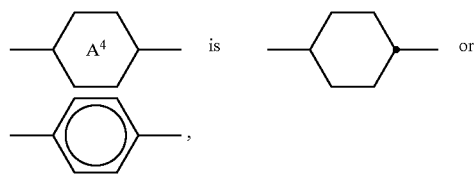

$Z^4$ is COO, $CH_2CH_2$, —C≡C— or a single bond, where the phenyl rings may each independently optionally be monosubstituted or disubstituted by F, and $n^4$ is 0, 1 or 2.

5. The medium according to claim 1, further comprising at least one compound of formula V

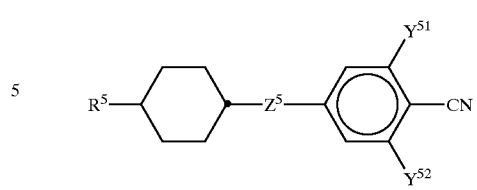

$R^5$ is alkyl of 1 to 9 carbon atoms, $Z^5$ is —$CH_2CH_2$—, —COO— or a single bond, and $Y^{51}$ and $Y^{52}$ are each independently H or F.

6. The medium according to claim 1, further comprising at least one compound of formula II1

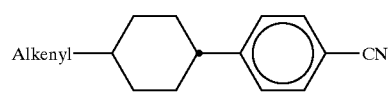

Alkenyl is $C_{n^2}H_{2n^2+1}$—CH=CH$(CH_2)_{m^2}$, $n^2$ is from 0 to 5, $m^2$ is from 0 to 5, and $n^2+m^2$ is from 1 to 5.

7. The medium according to claim 1, further comprising at least one compound of the formulae VI2a or VI2b

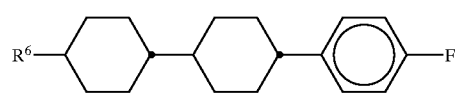

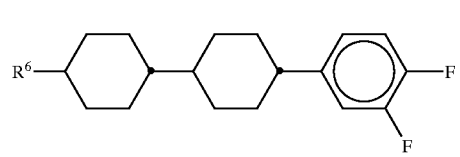

in which $R^6$ is independently as defined for $R^1$.

8. An electro-optical display, containing a liquid-crystal medium according to claim 1.

9. An electro-optical display, containing a liquid-crystal medium according to claim 2.

10. A display according to claim 9, which is an STN LCD.

11. The medium according to claim 1, further comprising at least one compound of formula VI

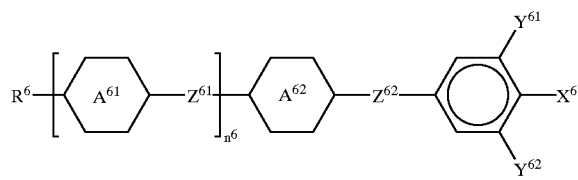

in which $R^6$ is as defined above for $R^1$ under the formula I,

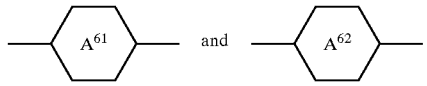

each are, independently of one another, 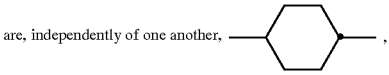

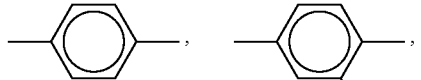

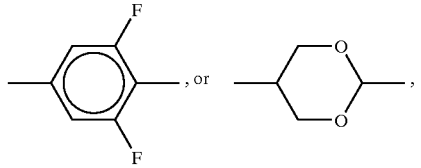

$Z^{61}$ and $Z^{62}$ are each, independently of one another, —$CH_2$—$CH_2$—, —CH=CH—, —COO— or a single bond, $X^6$ is F, Cl, $OCF_2H$, $OCF_3$ or $CF_3$, $Y^{61}$ and $Y^{62}$ are each, independently of one another, H or F, and $n^6$ is 0, 1 or 2.

12. The medium according to claim 1, further comprising at least one compound of the formulae VI2a or VI2b

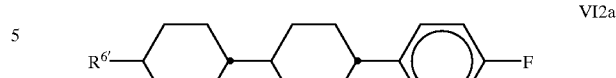

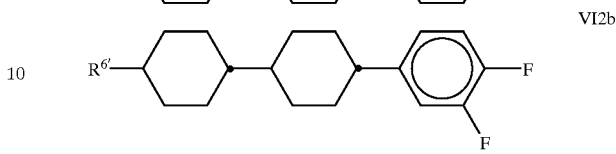

in which $R^{6'}$ is alkyl, alkoxyalkyl or alkenyl.

13. The medium according to claim 6, wherein $n^2$ is 1 to 5.

14. The medium according to claim 6, wherein $m^2$ is 1 to 5.

15. The medium according to claim 6, wherein $m^2$ is 2 to 5.

16. The medium according to claim 6, wherein $n^2$ is 1 and $m^2$ is 0.

17. The medium according to claim 6, wherein $n^2$ is 0 and $m^2$ is 2.

* * * * *

UNITED STATES PATENT AND TRADEMARK OFFICE
CERTIFICATE OF CORRECTION

PATENT NO.    : 6,649,228 B2
DATED         : November 18, 2004
INVENTOR(S)   : Juliane Suermann et al.

It is certified that error appears in the above-identified patent and that said Letters Patent is hereby corrected as shown below:

<u>Column 40,</u>
Line 24, reads "$CH(CH_2)_m^2$," should read -- $CH-(CH_2)_m^2$, --

Signed and Sealed this

Twenty-first Day of June, 2005

JON W. DUDAS
*Director of the United States Patent and Trademark Office*